Jan. 17, 1961     D. M. RICHEY     2,968,154
HYDRAULIC SYSTEM FOR A BOOM STRUCTURE
Filed Aug. 3, 1959     5 Sheets-Sheet 1

INVENTOR
David M. Richey
BY *Rockwell & Bartholow*
ATTORNEY

Jan. 17, 1961 D. M. RICHEY 2,968,154
HYDRAULIC SYSTEM FOR A BOOM STRUCTURE
Filed Aug. 3, 1959 5 Sheets-Sheet 4

INVENTOR
David M. Richey

BY *Rockwell & Bartholow*

ATTORNEYS

Jan. 17, 1961 D. M. RICHEY 2,968,154
HYDRAULIC SYSTEM FOR A BOOM STRUCTURE
Filed Aug. 3, 1959 5 Sheets-Sheet 5

INVENTOR
David M. Richey
BY Rockwell & Bartholow
ATTORNEYS

United States Patent Office 2,968,154
Patented Jan. 17, 1961

2,968,154
HYDRAULIC SYSTEM FOR A BOOM STRUCTURE

David M. Richey, Woodbridge, Conn., assignor to Emhart Manufacturing Company, Hartford, Conn., a corporation of Delaware Filed Aug. 3, 1959, Ser. No. 831,307

3 Claims. (Cl. 60—54.5)

This invention relates to hydraulic systems and controls for boom structures and especially compound boom structures having a plurality of boom-actuating motors. The boom structure may be of the type having a platform thereon to lift a tree surgeon, for example, a distance above the ground for work in trees, and having controls on the platform permitting the tree surgeon to control all movements of the boom structure from the platform.

One object of the invention is to provide an improved hydraulic system and controls for operating a boom structure.

Another object of the invention is to provide for a boom structure such as characterized above, a servo hydraulic system for remote operation of a primary control unit controlling movements of the boom structure.

Still another object of the invention is to provide an improved self-operating lock valve for controlling the ingress and egress of fluid from a hydraulic cylinder.

Further objects will be apparent from the following detailed explanation of the embodiment of the invention illustrated in the drawings by way of example.

The articulated boom structure shown in the drawings, by way of example, is illustrated in association with a conventional truck provided with stabilizing outriggers, and having a fixed rear platform supporting a rotary turret swiveling on a vertical axis and on which is pivoted a lower boom for vertical swinging movement. In the form shown, the boom structure includes two booms, the second or upper boom having one end portion thereof pivotally mounted on the outer end of the lower boom to swing vertically on the latter. A self-leveling platform, or crow's nest, is pivotally mounted on the outer end of the upper boom, and is provided with controls for raising and lowering the booms and rotating the booms as a unit with the turret. In the drawings, the stationary platform of the truck is indicated at A, the rotary turret at B, the lower boom at C, the upper boom at D, and the crow's nest or work platform at E. The turret B, the lower boom C, and the upper boom D are all worked through hydraulic cylinders.

The body of the turret B, which is of generally cylindrical form, is supported on a generally cylindrical member 10 extending upwardly from the platform A in fixed relation thereto, the turret B being suitably mounted on the member 10 to rotate thereon in embracing and concentric relation. To rotate the turret, a cable-drive mechanism, indicated generally at 14, is provided, and this mechanism, which may be of a conventional construction, is operated by a fluid motor, indicated generally at 15, comprising a fluid cylinder 15ª, and a piston rod 15ᵇ extensible from the cylinder to rotate the turret B in one direction and retractable to rotate the turret in the opposite direction. The booms C and D, which are pivotally interconnected, are folded one on the other when in their inoperative positions, shown in full lines in Fig. 1. The inner end of the lower boom C is received in a fitting 17, having a sleeve portion 17ª, snugly embracing and suitably secured to the inner end of the boom C in rigid relation thereto. The fitting 17 receives a transverse pivot shaft 12 extending through the upper extremity of the turret B to pivot the lower boom for vertical swinging movement. To effect upward swinging movement of the lower boom on the pivot shaft 12, a cable-drive mechanism, indicated generally at 25, is provided, and this mechanism is operated by a fluid motor 28 comprising a fluid cylinder 28ª and a piston rod 28ᵇ relatively extensible therefrom.

Figure 1:
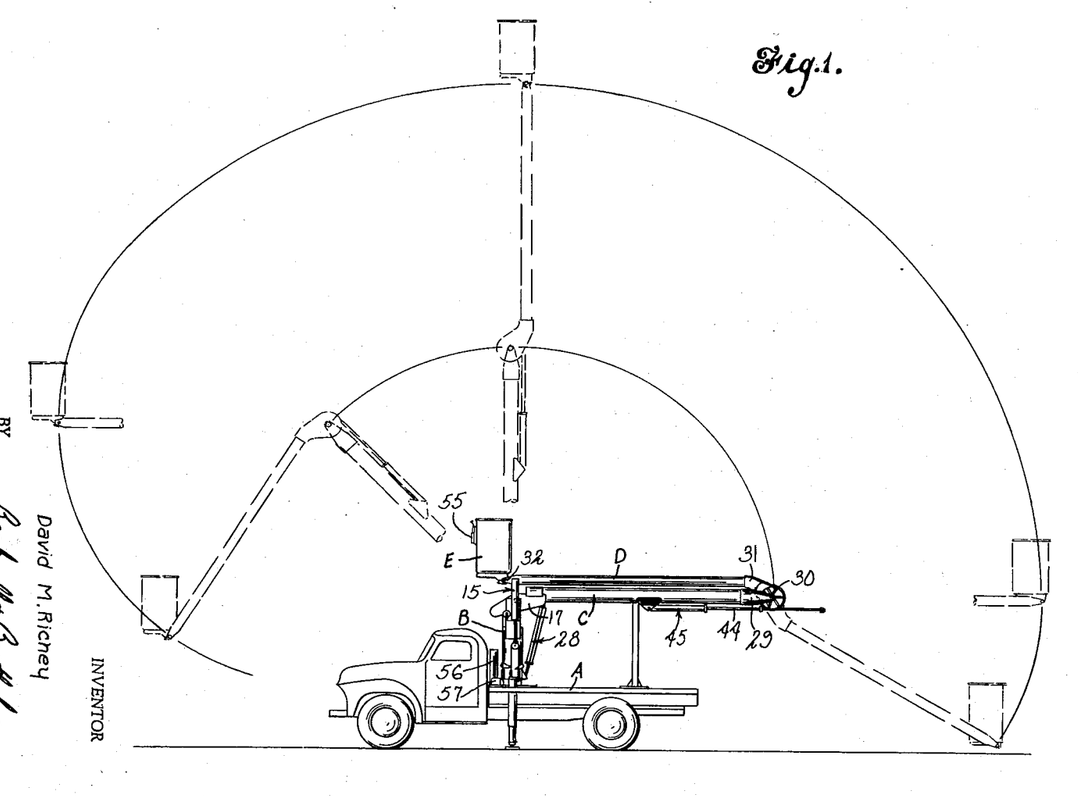
Fig. 1 is a side elevational view of a mobile articulated boom structure to which the invention may be applied, and illustrating in broken lines the amplitude of swinging movement obtainable in the use of the structure.
Figures 2, 5:
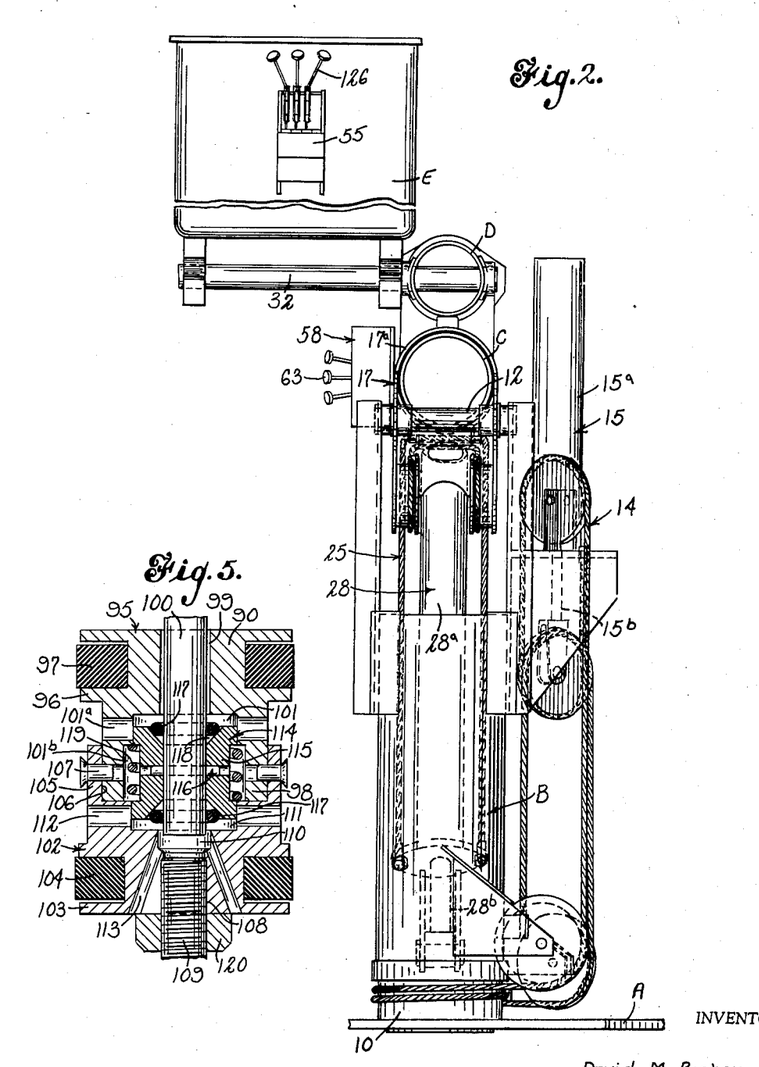
Fig. 2 is a broken and fragmentary elevational view looking at the left end of the boom structure as viewed in Fig. 1.
Fig. 5 is an enlarged fragmentary view in section further illustrating certain parts shown in Fig. 4.
Figure 3:
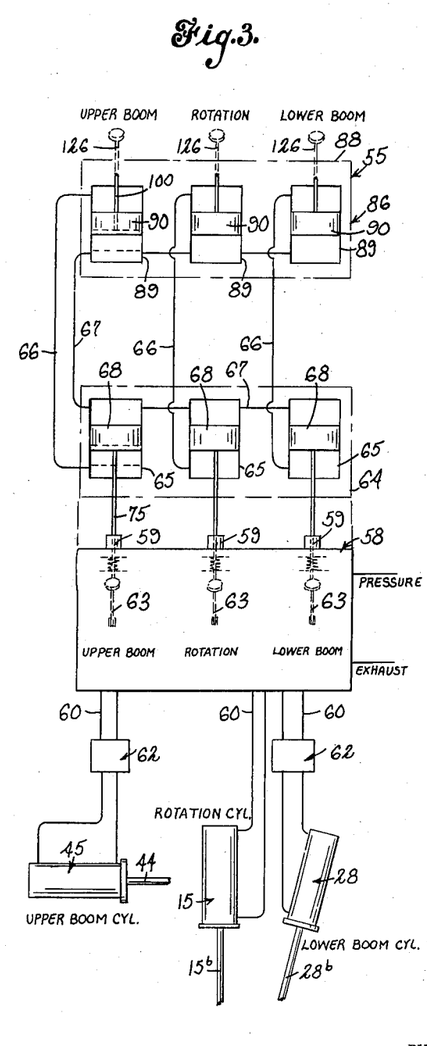
Fig. 3 is a diagrammatic view of the hydraulic system of the articulated boom structure.

As shown in Fig. 1, the outer end of the lower boom C is provided with a sleeve fitting 29 in fixed relation thereto and pivoted, as at 30, to an elbowed sleeve fitting 31 embracing and fixed to the inner end of the upper boom D. To effect upward swinging movement of the boom D on the axis of the pivot 30 a cable-drive mechanism (not shown), similar to the cable-drive mechanism 25, is provided. The cable-drive mechanism for the upper boom is operated by a fluid motor 45, similar to the fluid motors 15 and 28, and is provided with an extensible piston rod 44. The foregoing description of the operating connections between the fluid motors 28 and 45 to effect upward swinging movement of the lower and upper booms, respectively, will suffice in as much as these connections are described in detail and claimed in U.S. Patent No. 2,940,539, issued June 14, 1960. The crow's nest or platform E, is pivoted to the outer end of the upper boom D as at 32 and is maintained level in all positions of the booms by a conventional leveling mechanism, not shown. The structure previously described may, for present purposes, be considered old as the instant application concerns only the hydraulic system and controls for operating the boom structure. The crow's nest is provided at a suitably convenient location with a control unit 55 for the hydraulic system so that complete control of the articulated boom structure may be effected by a person in the crow's nest. In Fig. 3 there is shown a partial diagrammatic layout of the hydraulic system by which the rotatable turret B, the lower boom C, and the upper boom D are selectively operable from the control unit 55 by the workman in the crow's nest. In Fig. 1 there is shown a reservoir 56 for hydraulic fluid and a pump 57 is interposed in the outlet_ line from the reservoir to deliver fluid under pressure to the inlet side of a conventional control unit 58 (Fig. 2). The control unit 58, having the outlet side thereof connected to the reservoir (Fig. 3), is provided with three slide valves 59, one of the valves 59 controlling the operation of the turret B, another controlling the lower boom C, and the third controlling the upper boom D. Each valve 59 is spring biased to the neutral position thereof. The control unit 58, mounted on the fitting 17 of the lower boom, is provided with three pairs of feed lines 60, each pair being controlled by one of the valves 59. As shown in Fig. 3, the pairs of feed lines 60 are connected to the respective fluid motors operating the turret, the lower boom and the upper boom. As shown in the last-mentioned view, the feed lines 60 are connected to the respective ends of the fluid cylinders, the arrangement being such that fluid may be admitted and discharged from both ends of each fluid cylinder to impart movement to the piston therein. Two supplemental control units, indicated generally at 62 are provided, one control unit 62 being interposed in each pair of feed lines 60, except for the pair leading to the turret-operating fluid motor, as shown in Fig. 3. The control units 62, operating to restrict ingress and egress of hydraulic fluid to the respective boom-operating fluid motors, will be described in detail hereinafter.

Associated with the control unit 58 is a cylinder block 64 having three cylinders 65 formed therein, as shown in Fig. 3. As shown in the last-mentioned view, each cylinder 65 has a feed line 66 connected to one end thereof. A feed line 67 interconnects the other ends of the cylinders 65, and each cylinder 65 has a piston 68 therein. The pistons 68 are fixed to the respective valves 59 of the control unit 58 to operate the latter. The control unit 58 is provided with manually operable control levers 63 having suitable operative connections (not shown) to the respective valves 59 so that, if desired, full control of the articulated boom structure may be effected by a person standing near the turret and supported on the platform A of the truck. The control unit 58 is well known in the art and need not be described here in detail. For an understanding of the operation of the control unit 58 it will suffice to explain that each valve 59 has three positions: a neutral position in which hydraulic fluid circulates through the unit 58 and is returned to the reservoir; another position in which fluid is delivered to one end of one fluid cylinder and discharged from the other end; and a third position in which the flow of fluid in the feed lines 60 is reversed. Hence, it will be understood that when the valve 59 operatively associated with the fluid motor 45 operating the upper boom D, for example, is moved from the neutral position thereof in one direction, the piston rod 44 of the motor is retracted, thereby effecting swinging movement of the boom in one direction, while movement of the same valve 59 from the neutral position in the opposite direction effects extension of the piston rod 44 and consequent swinging movement of the upper boom in the opposite direction.

Figure 7:
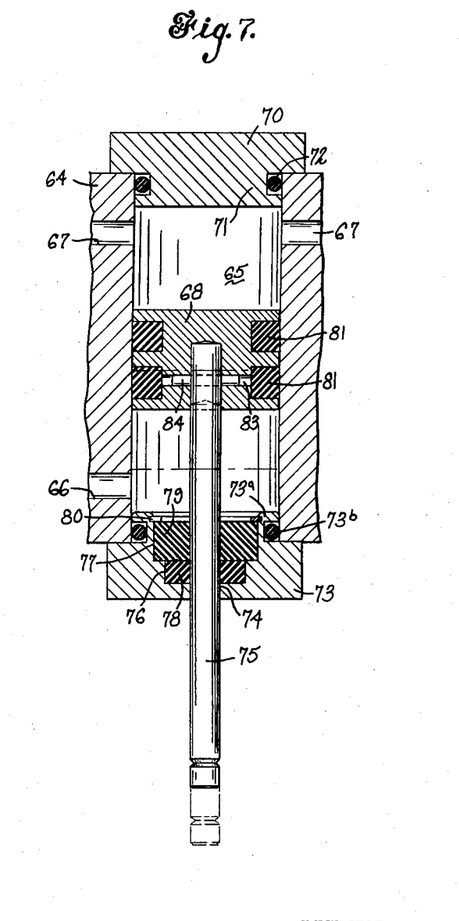
Fig. 7 is a fragmentary sectional view illustrating a piston controlled by the valve.

The control unit 55, together with the cylinder block 64, feed lines 66, 67, pistons 68 and other appurtenant parts to be described hereinafter, constitutes a servo hydraulic system for operating the control unit 58 from the remote location of the unit 55 mounted on the crow's nest. There is shown in Fig. 7 one of the cylinders 65 formed in the block 64 and receiving one piston 68 which may have a suitable fixed connection (not shown) with the valve 59 operating the fluid motor associated with the upper boom D, for example, the other cylinders 65 and pistons 68 being constructed in like manner. As shown in the last-mentioned view, one end of the cylinder 65 is sealed by a cylinder cap 70 having an integral portion 71 forming with the cylinder wall an O-ring chamber receiving an O-ring 72 having sealing engagement with the cap and the cylinder wall. The cap 70 may be secured to the cylinder block 64 by suitable bolts, not shown. At the other end thereof, the cylinder 65 is closed by a cylinder cap 73 having an integral portion 73$^a$ forming with the cylinder wall an O-ring chamber receiving an O-ring 73$^b$ having sealing engagement with the cap 73 and the cylinder wall. The cap 73, which may be secured to the cylinder block 64 by suitable bolts, not shown, is provided with a bore 74 extending therethrough and receiving a piston rod 75 connected with the piston 68. The bore 74 is enlarged by an inwardly facing counterbore 76 and further enlarged by an inwardly facing counterbore 77. A sealing member 78 of rubber-like material embracing the piston rod 75 is disposed in the counterbore 76. A similar sealing member 79 is disposed in the counterbore 77 in abutting relation to the member 78. Dislocation of the sealing members 78, 79 is inhibited by a split ring 80 extending into a groove formed in the portion 73 and partially overlying the member 79 in abutting relation. As shown in Fig. 7, the piston 68 is provided with a pair of spaced piston rings 81 of rubber-like material having sealing engagement with the side-wall structure of the cylinder 65 and extending into suitable circumferential grooves formed in the piston 68. The inner end of the piston rod 75 extends into and is secured to the piston in the manner shown in Fig. 7, the piston 68 having a transverse bore 83 formed therein receiving a pin 84 extending through the inner end portion of the piston rod 75. The ends of the bore 83 are closed by one of the piston rings 81 in the manner shown in Fig. 7.

Figure 6:
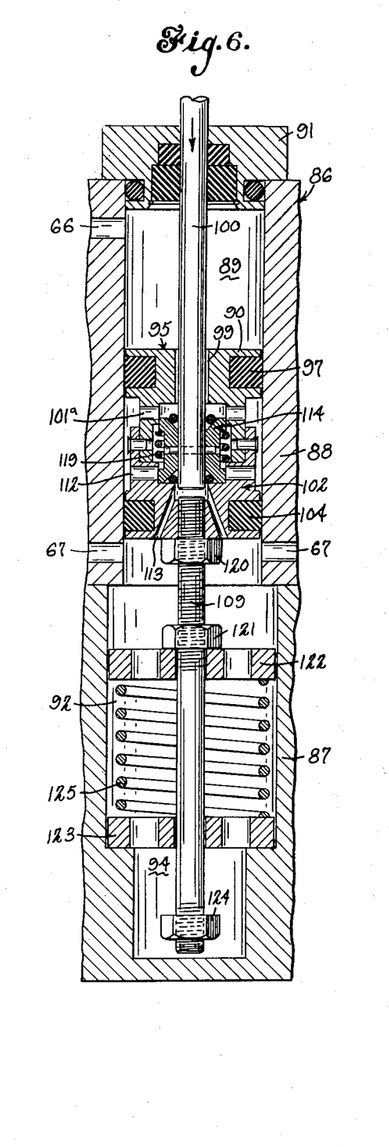
Fig. 6 is a view similar to Fig. 4 showing the valve in another position.

As shown in Fig. 3, the feed lines 66, 67 associated with the cylinder block 64 lead to the control unit 55. The control unit 55 includes a composite cylinder block, indicated generally at 86, constituted by a lower block member 87 (see Fig. 6) and an upper block member 88, the members 87, 88 being secured together as by bolts, not shown. As shown diagrammatically in Fig. 3, the cylinder block 86 has three cylinders 89 formed therein. The aforementioned feed lines 66, leading from the cylinder block 64, are connected with the respective upper ends of the cylinders 89 while the other ends of the cylinders 89 are interconnected by the feed line 67 leading from the block 64, as shown in Fig. 3. Each cylinder 89 has a piston 90 therein, one piston 90 with its appurtenant parts being shown in Fig. 5. As shown in Fig. 6, the upper end of the cylinder 89 is closed by a cylinder cap 91 similar to the above-described cap 73 with its appurtenant parts. The cap 91 may be secured to the upper block member 88 by suitable bolts, not shown. The cylinder 89 is provided with a diametrically enlarged extension portion 92 formed in the block member 87, as shown in Fig. 6. Adjoining the cylinder portion 92, there is provided an extension portion 94 of somewhat smaller diameter than the upper portion of the cylinder 87 and closed at the bottom thereof by an integral part of the block member 87.

As shown in Fig. 5, the piston 90 is of composite structure including an upper element, indicated generally at 95, having an integral portion 96 grooved circumferentially to receive a piston ring 97 of rubber-like material for sealing engagement with the side-wall structure of the cylinder 89. Below the portion 96, the element 95 is provided with an integral portion 98 of reduced diameter spaced from the cylinder wall. The element 95 is provided with a concentric bore 99 through which a piston rod 100 extends with clearance, the piston rod 100 extending through the cap 91. The bore 99 is enlarged by a downwardly facing counterbore 101 communicating with a plurality of radial ports 101$^a$ extending through the portion 98. The bore 99 is further enlarged by a downwardly facing counterbore 101$^b$ below the ports 101$^a$.

The composite piston structure shown in Fig. 5 also includes a lower element, indicated generally at 102, having an integral portion 103 grooved circumferentially to receive a piston ring 104 of rubber-like material for sealing engagement with the cylinder wall. The element 102 has an integral upper portion 105 of reduced diameter spaced from the cylinder wall, the portion 105 having a socket 106 formed in the upper extremity thereof into which the portion 98 of the element 95 extends and is secured by rivets 107. The lower element 102 is provided with a concentric bore 108 threaded throughout the lower part thereof to receive a threaded end of a shaft 109. Above the last-mentioned end of the shaft 109, the bore 108 is enlarged by an upwardly facing counterbore, as at 110, and is further enlarged by an upwardly facing counterbore 111 extending through the bottom of the socket 106. It will be understood that the socket 106 is formed by an upwardly facing counterbore enlarging the bore 108 to an even greater extent at the upper extremity of the portion 105. A plurality of radial ports 112 are provided communicating with the counterbore 111 and extending through the periphery of the portion 105 below the socket 106. A plurality of ports 113 communicate with the counterbore 110 and diverge from the latter in the manner shown in Fig. 6, the ports 113 extending through the bottom of the element 102.

As best shown in Fig. 5, a generally cylindrical valve member 114 extends into the opposing counterbores 101 and 111 for sliding movement relatively to the piston 90. The member 114 receives the piston rod 100 in the manner shown in Fig. 5. The valve member 114, having a central portion 115 of reduced diameter, is secured to the inner end of the piston rod 100 by a pin 116 received in a substantially central cross bore formed in the member 114, the pin 116 extending through the inner end portion of the rod 100 in a transverse direction. A pair of sealing rings 117 are provided and inhibit the flow of hydraulic fluid along the portion of the rod 100 extending through the valve member 114, one sealing ring 117 being disposed at each end of the member 114 in tightly embracing relation to the rod 100. As shown in Fig. 5, each end of the member 114 is recessed, as at 118, to provide a seat for one sealing ring 117. The ends of the valve member 114 fit snugly within the respective counterbores 101, 111. A helical compression spring 119, embracing the portion 115 of the valve member, constantly urges the valve member to the neutral position thereof in which the ports 101a and 112 are only partially closed by the member 114, as shown in Fig. 5. As best shown in the last-mentioned view, the spring 119 is interposed in the space between the middle portion 115 of the valve member and the side wall of the counterbore 101b. The arrangement is such that when the valve member 114 is moved from the position of Fig. 4 to the position of Fig. 6 by downward movement of the piston rod 100, the spring 119 is further compressed between the enlarged upper end of the member 114 and the bottom of the counterbore 106. It will be understood that when the member 114 is moved from the neutral position to the other closed position thereof by movement of the piston rod 100 in the opposite direction, the spring 119 is compressed between the enlarged lower end of the member 114 and the bottom of the counterbore 101b. In the last-mentioned position of the valve member 114, the ports 101a are sealed off from the bore 99 by engagement of the upper sealing ring 117 with the bottom of the counterbore 101. When the valve member 114 is in the position of Fig. 6, the ports 112 are sealed off from the bore 110 by engagement of the lower sealing ring 117 with the bottom of the counterbore 111.

Figure 4:
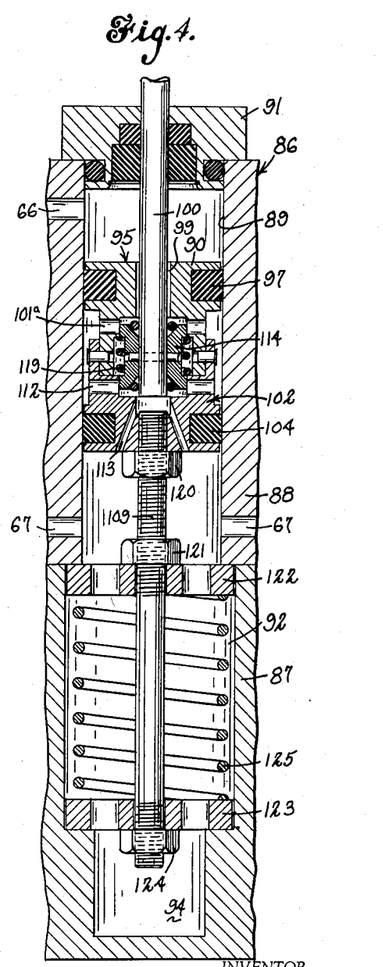
Fig. 4 is a fragmentary sectional view illustrating a manually operable valve in the hydraulic system.

The shaft 109 threaded into the lower end of the composite piston 90 is secured in adjusted position with respect thereto by a lock nut 120. A nut 121 is threaded on the shaft 109 below and in spaced relation to the nut 120 to serve as an abutment for a spring compressor plate 122 loosely received on the shaft 109. A spring compressor plate 123 is loosely received on the shaft 109 below and in spaced relation to the plate 122, and a nut 124 is threaded on the shaft 109 below the plate 123 to serve as an abutment for the latter. The spring compressor plates 122, 123 are separated by a compression spring 125 embracing the shaft 109. The plates 122, 123 are perforated to permit the flow of hydraulic fluid therethrough. As indicated in Fig. 4 for example, the spring compressor plates 122, 123 are snugly received in the cylinder portion 92, and upward movement of the plate 122 is limited by engagement of the latter with the upper block member 88, while downward movement of the plate 123 is limited by engagement of the latter with the bottom of the counterbore forming the cylinder portion 92. From the foregoing disclosure, it will be apparent that the construction and arrangement is such that the spring 125 constantly urges the composite piston 90 toward the neutral position shown in Fig. 4. It will be understood that when the piston rod 100 is moved from the neutral position in the direction of the arrow of Fig. 6, downward movement of the compressor plate 122 is effected through the nut 121 to further compress the spring 125 from the upper end of the latter. It will also be understood that when the piston 90 is moved from the neutral position in the opposite direction, the spring 125 is compressed from the other end thereof by the compressor plate 123, upward movement of the latter being effected through the nut 124.

Three toggle levers 126 (see Fig. 2) are provided for manual operation of the respective pistons 90, the levers 126 being suitably mounted on the control unit 55 located on the crow's nest E. Each lever 126 has a suitable connection (not shown) to one piston rod 100 to impart reciprocating movement to the latter when the lever is swung upwardly and downwardly from the neutral position thereof.

The operation of the servo hydraulic system is as follows. When the toggle lever 126 controlling the upper boom, for example, is swung upwardly from the neutral position thereof by the operator in the crow's nest, the piston rod 100 operatively associated therewith is moved in a downward direction carrying with it the valve 114 which is moved relatively to the piston 90 to the position of Fig. 6, thereby closing off circulation of hydraulic fluid from one side of the piston 90 to the other. Continued upward swinging movement of the toggle lever 126, through further movement of the valve member 114, effects downward movement of the piston 90 to the broken-line position of Fig. 3. When the pressure of hydraulic fluid below the piston 90 operating the upper boom is increased by movement of the piston to the broken-line position of Fig. 3, the pressure is transmitted to the lower ends of the cylinders 89 operatively associated with the turret B and the lower boom C through the feed line 67. However, when the valve members 114 associated with the pistons 90 operatively connected to the turret and the lower boom are each in the neutral position of Fig. 4, the pressure at both sides of each of the last-mentioned pistons 90 is equalized by the circulation of fluid from one side of each piston to the other through the ports 113, the counterbore 110, the counterbore 111, the ports 112, the space between the cylinder wall and the portion 105 of the piston, the ports 101a, the counterbore 101, and the space between the piston rod 100 and the portion 96 of the piston. Hence, the pistons 90 associated with the turret and the lower boom are unaffected by downward movement of the piston 90 operatively associated with the upper boom. Furthermore, it will be understood that the aforementioned equalization of fluid pressure effects equalization of pressure at both sides of the pistons 68 operatively connected to the turret and the lower boom through the feed lines 66 and 67. Thus, when the piston 90 operatively connected to the upper boom is moved downwardly to the broken-line position of Fig. 3 from the full-line position thereof by operation of the toggle lever 126 associated therewith, the piston 68 operatively associated with the upper boom is moved from the full-line position to the broken-line position of Fig. 3 to effect movement of the valve 59 associated therewith, while the other pistons 68 remain in their neutral positions. It will also be understood that when upward pressure on the last-mentioned manually operable toggle lever 126 is released, the valve member 114 operatively associated therewith is returned to neutral position by the spring 119 and the piston 90 is returned to the neutral position thereof by the action of the spring 125. Movement of the piston 90 to the neutral position effects return of the piston 68 to the neutral position through movement of the spring-biased valve 59.

From the foregoing, it will be apparent that when the last-mentioned toggle lever 126 is swung from the neutral position in the opposite direction, the valve member 114 associated therewith is moved upwardly with the piston rod 100, closing the ports 101$^a$ and effecting upward movement of the piston 90 from the neutral position thereof. Upward movement of the piston 90 increases the fluid pressure in the upper part of the cylinder and this pressure is transmitted to the lower end of the cylinder 65 operatively associated therewith through the feed line 66. This effects upward movement of the piston 68 in the last-mentioned cylinder to impart movement to the operatively associated valve 59 in the opposite direction. When downward pressure on the toggle lever 126 is released, the valve member 114 is returned to the neutral position thereof by the spring 119. The piston 90 is returned by the action of the spring 125 and effects return of the piston 68 to the neutral position thereof through movement of the spring-biased valve 59. The servo hydraulic system, which is a low pressure self-contained system, may be equipped with a small reservoir, not shown.

The provision of the servo hydraulic system obviates the need for extending the high pressure lines 60 to the outer end of the articulated boom structure, thereby conserving pressure. Furthermore, the use of the servo system reduces the weight carried by the booms inasmuch as it would otherwise be necessary to mount the heavy control unit 58, with its numerous appurtenant lines 60, on the crow's nest. In the low pressure servo system the lines 66 and 67, which total only four, may be small in diameter and light in weight.

Figure 8:
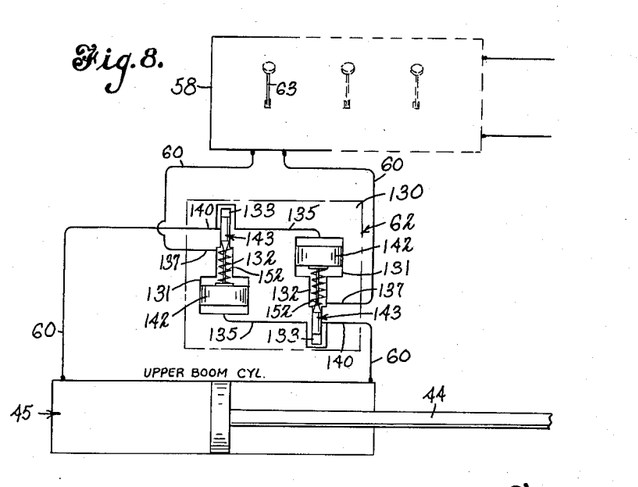
Fig. 8 is a diagrammatic view of valve means employed in the hydraulic system to restrict ingress and egress of fluid from a hydraulic cylinder.

One of the above-mentioned control units or restrictors 62 is illustrated diagrammatically in Fig. 8, the restrictor shown in this view being the one operatively associated with the upper boom, the other restrictor 62, associated with the lower boom, being identical. As mentioned above, the restrictor 62 interposed in the high pressure lines 60 leading from the control unit 58 to the fluid motor cylinder 49 operatively associated with the upper boom restricts egress of fluid from the cylinder 49 and may be physically incorporated in a suitable manner, not shown, in the structure of the cylinder 49.

Figure 9:
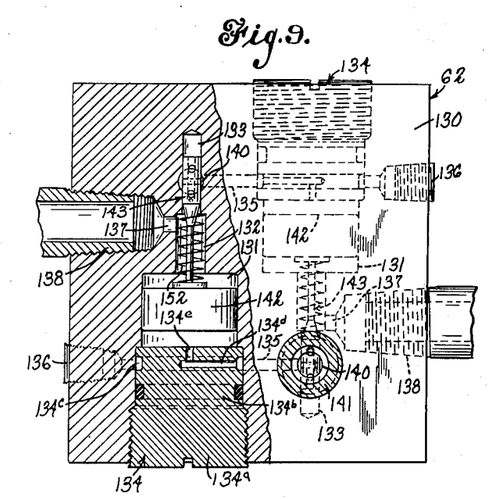
Fig. 9 is a fragmentary view, partially in section, illustrating the valve means of Fig. 8 and showing one side of the valve block.
Figure 10:
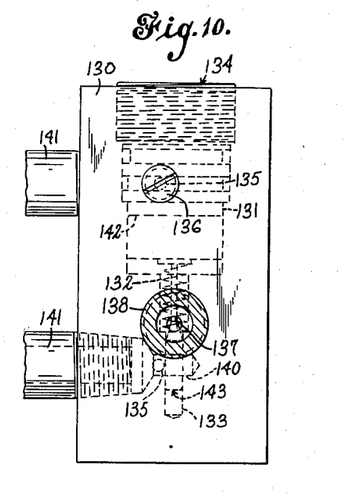
Fig. 10 is a further view of the valve means showing one end of the valve block.

The restrictor 62, shown in Figs. 8, 9, and 10, comprises a valve casing or block 130 having two cylinders formed therein, as at 131. Each cylinder 131 has an extension portion 132 of substantially smaller diameter than the body of the cylinder and terminating in an endwise extension portion 133 of still smaller diameter, the cylinders 131 with their extension portions being reversely arranged with respect to one another as shown in Fig. 8, for example. As shown in Fig. 9, the cylinder extension portions 133 are formed by bores extending into the casing 130 from opposite sides thereof and terminating in the body of the casing, each bore being enlarged by a counterbore to form one extension portion 132 and being further enlarged by another counterbore to form the body of one cylinder 131. Each of said last-mentioned bores is further enlarged to receive a cylinder cap 134 having a part 134$^a$ threaded into the casing 130. As best shown in Fig. 9, each cylinder cap 134 is provided with an inner part 134$^b$ snugly received in one of said bores in the casing 130 and of slightly smaller diameter than the part 134$^a$. The part 134$^b$ of each cylinder cap is provided with a circumferential groove 134$^c$ communicating with a radial passage 134$^d$ connected to a vertical concentric passage 134$^e$ extending through the inner end of the part 134$^b$, the groove 134$^c$ being in direct communication with a lateral fluid passage 135 formed in the block 133, as shown in Fig. 9. As illustrated in the last-mentioned view, the outer ends of the lateral fluid passages 135, extending through opposite sides of the casing 130, are closed by suitable plug members 136 threaded into the casing. Also as shown in the last-mentioned view, a pair of lateral fluid passages 137 are provided, one passage 137 extending through each of the last-mentioned sides of the casing and leading to the respective counterbores 132. As shown in Fig. 8 for example, each fluid passage 137 leads into one of the counterbores 132 adjacent the bottom thereof. The passages 137 are directly connected to the respective fluid lines 60 leading from the control unit 58 in the illustrated form, and as shown in Fig. 9, the passages 137 are provided with enlarged threaded parts receiving threaded nipples 138 forming terminals for the last-mentioned lines 60. A pair of fluid passages 140 are formed in the casing at right angles to the passages 137, each passage 140 being of a diameter slightly in excess of the diameter of the cylinder extension portions 133 and intersecting one fluid passage 135. Each passage 140 is also of a diameter somewhat larger than the diameter of the passages 135. The fluid passages 140 in the illustrated form are directly connected to the respective fluid lines 60 leading from the motor cylinder 49, the last-mentioned lines 60 having nipples 141 forming terminals for the respective lines and threaded into enlargements in the respective passages 140 extending to one face (see Fig. 10) of the casing.

Figure 11:
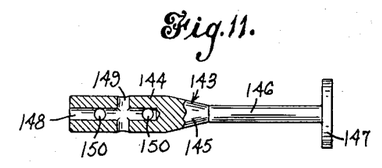
Fig. 11 is an enlarged detail view, partially in section, illustrating an element of the valve means.

Two pistons 142 are provided, one piston 142 being disposed in the body portion of each cylinder 131. Two shuttle valves 143 are provided for cooperation with the respective pistons 142, one of the valves 143 being shown in detail in Fig. 11 and the other being identical. The valve 143 shown in Fig. 11 has a cylindrical body portion 144 adjoining a tapered portion 145 leading to a neck 146 terminating in a flat head 147. The cylindrical body portion 144 of the valve has a longitudinal bore 148 formed therein extending through one end of the valve and terminating adjacent the portion 145. The valve portion 144 is also provided with a cross bore 149 extending therethrough and communicating with the bore 148 intermediate the ends of the latter. The body portion 144 of the valve is also provided with two cross bores 150 extending therethrough and communicating with the bore 148, the cross bores 150 being disposed at opposite sides of the cross bore 149 (see Fig. 11) and extending at right angles thereto.

The shuttle valves 143 are disposed in the valve casing 130 in the manner shown in Fig. 9, the body portion 144 of each valve extending into one cylinder portion 133 and the head 147 of the valve being engageable with the corresponding piston 142. As shown in the last-mentioned view, two compression springs 152 are provided, one spring 152 embracing each valve 143 and being interposed between the head 147 thereof and the bottom of the corresponding counterbore 132 to urge the valve to the closed position thereof.

The operation of the restrictor 62 associated with the upper boom, for example, is as follows. When the manually operable toggle lever 126 operatively associated with the upper boom is moved from the neutral position thereof to a position to effect extension of the boom-operated piston rod 44 from the fluid cylinder 49, hydraulic fluid is directed from the control unit 58 through the left line 60 (see Fig. 8) to one fluid passage 137 and into the corresponding cylinder extension 132 of the restrictor.

The valve 143 extending into the last-mentioned cylinder extension 132 is lifted and moved to the open position thereof by the pressure of fluid on the tapered portion 145 thereof. When the last-mentioned valve 143 is open, fluid flows from the cylinder extension 132 into the corresponding fluid passages 135 and 140. Fluid flowing through the last-mentioned passage 140 passages into the left line 60 (Fig. 8) leading from the restrictor 62 to the corresponding end of the motor cylinder 49. Fluid flowing through the last-mentioned passage 135 passes into the corresponding groove 134ᶜ and through the corresponding passages 134ᵈ and 134ᵉ to the upper end of the right cylinder 131 (Fig. 8), thereby forcing the corresponding piston 142 downwardly to engage the head of the corresponding valve 143. Downward movement of the last-mentioned piston 142 effects movement of the last-mentioned valve 143 to the open position thereof, thereby permitting fluid to escape from the other end of the motor cycle 49 through the right line 60 (Fig. 8) leading from the latter and through the corresponding passage 140 into the right cylinder extension 132 of the restrictor. Fluid entering the last-mentioned cylinder extension 132 escapes through the corresponding passage 137 and passes back to the control unit 58 through the right line 60 (Fig. 8) leading from the restrictor 62. Thus it will be understood that movement of the last-mentioned toggle lever 126 in one direction from the neutral position thereof effects movement of hydraulic fluid through the restrictor 62 operatively associated therewith to effect extension of the piston rod 44 operating the upper boom D. It will also be understood that movement of the same toggle lever 126 from the neutral position thereof in the opposite direction effects a reverse flow of fluid through the last-mentioned restrictor 62 to retract the piston rod 44 operatively associated with the upper boom D. The valves 143 are provided with the passages 148, 149 and 150 to prevent fluid from being trapped in the cylinder extensions 133 when the valves are moved to their open positions.

When the last-mentioned toggle lever 126, for example, is returned to the neutral position thereof, the valves 143 in the restrictor 62 operatively associated therewith tend to return to their closed positions. However, when the upper boom D is in a position such that the weight thereof exerts a thrust on the piston rod 44 in a direction tending to retract the latter for example, the restrictor 62 effectively inhibits the escape of fluid from the motor cylinder 49 in the following manner. Fluid tending to escape from the left end of the upper boom cylinder shown diagrammatically in Fig. 3 may pass through the left passage 140 and through the corresponding passage 135 to exert a downward pressure on the right piston 142, thereby opening or maintaining in open position the right valve 143 shown in Fig. 8. Thus, fluid tending to escape from the left end of the fluid cylinder shown in Fig. 8, tends to be trapped above the right piston 142. Furthermore, as the thrust on the piston rod 44 in the present instance is in a direction tending to reduce fluid pressure in the right end of the upper boom cylinder shown in Fig. 8, there is little or no tendency for fluid to pass from the last-mentioned end of the fluid cylinder past the open right valve 143, to open the left valve 143. Thus it will be understood that when a force, such as the weight of the upper boom, is exerted on the piston rod 44 tending to retract the latter, the left valve 143 remains closed tending to inhibit escape of fluid from the left end of the fluid cylinder shown in Fig. 3. Conversely, when such a force is exerted on the piston rod 44 tending to extend the latter, the other valve 143 remains closed to inhibit escape of fluid from the right end of the fluid cylinder shown in Fig. 8. It will be understood that the operation of the restrictor 62 associated with the lower boom C is identical to that of the above-described restrictor 62 associated with the upper boom D.

In accordance with the foregoing disclosure, there is provided an improved hydraulic system for boom structures. One advantage of the system resides in the provision of remote controls which, while permitting full control of all of the boom structure's movements, does not encumber the boom sections. The hydraulic system enables one to control the structure from a supporting platform at the outer end of the outer boom section and does not require the running of heavy high pressure conduits the length of the boom structure. This also serves to inhibit loss of pressure in those conduits which run to the fluid motors. The control conduits are low pressure lines, small in diameter and light in weight. Furthermore the system requires only four of these lines to operate three fluid motors. It will be understood from the foregoing that these controls constitute a servo system for operating a primary control unit which may be located on the bottom of the boom structure to tend to keep to a minimum the weight of the boom sections.

There is also provided a lock valve of improved construction for controlling the ingress and egress of fluid from a hydraulic cylinder serving to swing a boom section vertically and which may be subjected to considerable pressure due to the weight of the boom section. The valve tends to inhibit escape of fluid from a hydraulic cylinder when the hydraulic system is inoperative or idle and the boom section is partially or fully raised. In normal operation, the lock valve permits escape of fluid from one end of a hydraulic cylinder only when the pressure of the incoming fluid of the other end of the cylinder reaches a predetermined degree. A further advantage of the system is that it is of the fail-safe type.

While only one form of the system has been illustrated in the drawings above, it will be apparent to those versed in the art that the system is susceptible of various changes and modifications in details without departing from the principles of the invention and the scope of the appended claims.

What I claim is:

1. In a servo hydraulic system for remote operation of a plurality of slide valves each having two extreme operative positions and being spring biased to an intermediate neutral position, a cylinder block having cylinders formed therein corresponding in number to the slide valves, pistons in the cylinders provided with piston rods fixed to the respective slide valves, a second cylinder block at a point remote from the first block and having cylinders formed therein corresponding in number to the first-mentioned cylinders, pistons in the cylinders in the second block, fluid lines each having one end thereof connected to one end of each of the first-mentioned cylinders and having the other end thereof connected to the opposite end of the corresponding cylinders in the second block, fluid passage means interconnecting the other ends of said cylinders, the pistons in the second block being spring biased to neutral positions intermediate the ends of the cylinders, each of the last-mentioned pistons having means defining an orifice at each end thereof and a longitudinal valve chamber therebetween, valve means extending into each valve chamber and movable lengthwise to close either of said orifices, the valve means being spring biased to an intermediate open position, and said valve means comprising a movable control member extending from the piston to impart closing movement of the valve means and movement of the piston to operate the corresponding slide valve.

2. A servo hydraulic system as defined in claim 1, wherein said control member is of rod form extending loosely through one of said orifices, and wherein the valve means comprises a valve member in said chamber embracing the control member in fixed relation thereto.

3. In a servo hydraulic system for remote operation of a plurality of slide valves each having two extreme operative positions and being spring biased to an intermediate neutral position, a cylinder block having cylinders formed therein corresponding in number to the slide valves, pistons in the cylinders provided with piston rods fixed to the respective slide valves, a second cylinder block at a point remote from the first block and having cylinders formed therein corresponding in number to the first-mentioned cylinders, pistons in the cylinders in the second block, fluid lines each having one end thereof connected to one end of each of the first-mentioned cylinders and having the other end thereof connected to the opposite end of the corresponding cylinder in the second block, fluid passage means interconnecting the other ends of said cylinders, the pistons in the second block being spring biased to neutral positions intermediate the ends of the cylinders, each of the last-mentioned pistons having means defining an endwise fluid passage through the piston having intermediate of its ends a valve chamber, valve means extending into each valve chamber and movable therein to close said passages, the valve means being spring biased to open position, and said valve means comprising a movable control member extending from the piston to impart closing movement to the valve means and movement to the piston to operate the corresponding slide valve.

References Cited in the file of this patent

UNITED STATES PATENTS

| | | |
|---|---|---|
| 2,126,310 | Clench | Aug. 9, 1938 |
| 2,181,754 | White | Nov. 24, 1939 |
| 2,190,228 | Bowen | Feb. 13, 1940 |
| 2,292,916 | Wheelon | Aug. 11, 1942 |
| 2,356,517 | Hale | Aug. 22, 1944 |
| 2,360,539 | Ballard | Oct. 17, 1944 |
| 2,466,908 | Perrill | Apr. 12, 1949 |
| 2,468,489 | D'Arcey | Apr. 26, 1949 |
| 2,588,520 | Halgren et al. | Mar. 11, 1952 |
| 2,657,536 | Levy | Nov. 3, 1953 |
| 2,839,002 | Williams | June 17, 1958 |
| 2,878,784 | Pilch | Mar. 24, 1959 |